United States Patent [19]

Parekh et al.

[11] 4,026,855

[45] May 31, 1977

[54] COMPOSITION OF MATTER PARTICULARLY ADAPTABLE FOR USE IN ELECTRODEPOSITING FILMS ON METAL

[75] Inventors: Girish Girdhar Parekh, Stamford; Werner Josef Blank, Wilton, both of Conn.

[73] Assignee: American Cyanamid Company, Stamford, Conn.

[22] Filed: Oct. 20, 1975

[21] Appl. No.: 623,872

Related U.S. Application Data

[63] Continuation-in-part of Ser. No. 525,134, Nov. 19, 1974, abandoned, which is a continuation of Ser. No. 370,257, June 15, 1973, abandoned.

[52] U.S. Cl. .................... 260/29.4 UA; 204/181; 260/851; 428/460; 428/530
[51] Int. Cl.² ........................................ C08G 51/24
[58] Field of Search .................. 260/29.4 UA, 856; 204/181

[56] References Cited

UNITED STATES PATENTS

| | | | |
|---|---|---|---|
| 3,455,806 | 7/1969 | Spoor et al. | 204/181 |
| 3,464,946 | 9/1969 | Downing | 260/856 |
| 3,471,388 | 10/1969 | Koral | 260/856 |
| 3,502,557 | 3/1970 | Yurcheshen et al. | 204/181 |
| 3,663,389 | 5/1972 | Koral et al. | 260/856 |
| 3,682,814 | 8/1972 | Gilchrist | 204/181 |
| 3,723,374 | 3/1973 | Parekh et al. | 260/29.4 |
| 3,965,058 | 6/1976 | Yurcheshen et al. | 260/29.4 R X |

*Primary Examiner*—Theodore E. Pertilla
*Attorney, Agent, or Firm*—Frank M. Van Riet; James T. Dunn

[57] ABSTRACT

The disclosure relates to a composition of matter comprising a blend of an ungelled modified cross-linking agent, certain water-dispersible non-gelled polymeric materials carrying a cationic charge and an acid solubilizer in certain stated proportions. The disclosure also relates to the use of these compositions of matter in the process of electrodepositing films on an electrically conductive surface which comprises passing an electric current between a cathode comprising said surface and an electrically conductive anode immersed in an aqueous dispersion of said composition.

9 Claims, No Drawings

COMPOSITION OF MATTER PARTICULARLY ADAPTABLE FOR USE IN ELECTRODEPOSITING FILMS ON METAL

CROSS-REFERENCES TO RELATED APPLICATIONS

This application is a continuation-in-part of our earlier application Ser. No. 525,134 filed Nov. 19, 1974, which in turn was a continuation of our earlier application Ser. No. 370,257 filed June 15, 1973 both now abandoned.

BACKGROUND OF THE INVENTION

Blends of resinous materials have been manufactured and sold for a substantial plurality of years particularly when used as coating compositions. For a prolong period of time, experimentations were conducted to determine the feasibility of electrodepositing films from aqueous dispersions of blends of resinous material to electrically conductive metallic surfaces. It is frequently desirable to use a bland of a cross-linkable polymeric material with a cross-linking agent so that when the two components are deposited on the metallic surface, the entire composition can be converted to the cross-linked state by the application of heat such as by baking.

THE FIELD OF THE INVENTION

The present invention is in the field of polymeric materials that are particularly useful in the coating fields although these compositions may also be used in the manufacture of low pressure laminates, adhesives, molding compounds and textile treating resins. The compositions of the present invention are particularly adaptable for use in the electrode-position of films on an electrically conductive surface by passing an electric current between a cathode comprising said electrically conductive surface and an electrically conductive anode immersed in an aqueous dispersion of a mixture of certain quantities of a modified cross-linking agent and certain stated quantities of a water-dispersible non-gelled polymeric material carrying a cationic charge and as a third component to the composition, an acid solubilizer which imparts the cationic charge to the water dispersible non-gelled polymeric material. The compositions of the present invention can also be used for water based coatings by spray or dip coating and to apply a coating to the surface of existing paper webs from dispersions or solutions of the compositions of the present invention. The composition of the present invention can also be used to impregnate paper sheets for use in the manufacture of decorative laminates.

SUMMARY OF THE INVENTION

This invention relates to a composition of matter comprising an aqueous dispersion of a mixture of from about 4% to 50%, by weight, of (A) an ungelled modified cross-linking agent comprising an aminoplast cross-linking agent, having a pKa value below 3.6, modified by reaction with a non-resinous compound containing hydroxyl-group containing carboxylic acid, wherein the mol ratio of said unmodified cross-linking agent to said carboxylic acid is between 1:0.1 and 1:1 respectively, from about 40% to about 90%, by weight, of (B) a water dispersible non-gelled polymeric material carrying a cationic charge, having a pKb value above 5.5, which polymeric material contains at least one class of reactive groups selected from the group consisting of carboxyl groups, alcoholic hydroxy groups and amide groups and said polymeric material also contains amino groups wherein the total amount of said groups is at least about 0.5%, by weight, and not more than about 15%, by weight, based on the total weight of the polymeric material, wherein said carboxyl groups, alcoholic hydroxy groups and amide groups are heat reactive with (A), and from about 1% to about 10%, by weight, of (C) an acid solubilizer, wherein the said percentages of (A), (B) and (C), by weight, total 100% and are based on the total solids weight of (A), (B) and (C).

Still further this invention relates to the process for electrodepositing films on an electrically conductive surface which comprises passing an electric current between a cathode comprising said surface and an electrically conductive anode immersed in an aqueous dispersion of said composition of matter.

DESCRIPTION OF THE PREFERRED EMBODIMENTS

The compositions of the present invention are composed of three (3) essential components. The first component, identified as component (A), is an ungelled modified cross-linking agent comprising an aminoplast cross-linking agent that has been modified by reaction with a non-resinous hydroxyl-group containing carboxylic acid. The aminoplast cross-linking agents in their unmodified form have been utilized as cross-linking agents in the electrodeposition of aqueous coatings in which anionic water-dispersible non-gelled polymeric materials have been used. These aminoplast cross-linking agents can be prepared by reacting a urea with an aldehyde such as formaldehyde and then alkylating said urea-formaldehyde reaction product with a lower alkanol containing from one to four carbon atom such as methanol, ethanol, propanol or butanol. In addition to urea per se, one could make use of ethyleneurea, thiourea and the like. Additionally, one can make use of the amino-triazine aldehyde reaction products that have also been alkylated with comparable alkanols. In this connection, attention is directed to the U.S. Pat. No. 2,197,357 which shows a substantial plurality of amino-triazines reacted with aldehydes that are then alkylated by reaction with a substantial plurality of compounds containing an alcoholic hydroxy group. The said patent discloses a plurality of guanamines such as formoguanamine and acetoguanamine which can be used to form compatible alkylated aminoplast cross-linking agents. These cross-linking agents can be, and preferably are monomeric. Illustrative of such a monomeric aminoplast cross-linking agent is the hexakis (methoxymethyl)melamine. This monomeric compound can be prepared by a plurality of different processes such as those shown in the U.S. Pat. Nos. 2,918,452; 2,998,410 and 2,998,411. Unmixed ethers of the polymethylol triazines can be used well as mixed ethers such as the tetrakis (alkoxymethyl)benzoguanamines may be used which are disclosed in the U.S. Pat. No. 3,091,612. Mixed ethers of other triazines are disclosed in the U.S. Pat. No. 2,454,495. A lengthy dissertation on fully mixed ethers of hexamethylol melamine is set forth in the U.S. Pat. No. 3,471,388. The unalkylated melamine resins are shown in U.S. Pat. No. 2,260,239. All of the above-mentioned U.S. patents are incorporated herein by reference to avoid unnecessary redundancy.

In addition to using these cross-linking agents in the monomeric state, one may use low polymers of these reaction products such as dimers, trimers, tetramers and the like. It is generally preferred to utilize a cross-linking agent that has an average molecular weight not greater than about 1,000.

The modifier for these aminoplast cross-linking agent is a non-resinous hydroxyl-group containing carboxylic acid. These hydroxy group containing carboxylic acids may be any carboxylic acid which contains one or more alcoholic or phenolic hydroxyl groups wherein the —OH group which is part of the carboxyl group is by definition not considered a hydroxy group of either the alcoholic hydroxyl group or the phenolic hydroxyl group category.

Various hydroxy acids can be employed, including such compounds as salicylic acid, glycolic acid, α-hydroxy butyric acid, dimethylol propionic acid, mandelic acid, 2-hydroxy-3-methylbenzoic acid, lactic acid, gallic acid, 2,4-dihydroxybenzoic acid, 1-hydroxy-2-naphthoic acid, 2-hydroxy-1-naphthoic acid, and other aliphatic and aromatic hydroxyl-containing carboxylic acids.

Especially desirable for certain applications are carboxylic containing phenolic hydroxy groups. These have been found to impart a relatively high degree of alkali resistance and other desirable properties to the coatings. The preferred hydroxy group containing acid is salicylic acid. These modified cross-linking agents must have a pKa value of 3.6 or lower. The modified cross-linking agents, used in the composition of the present invention, exhibit good migration characteristics with a wide variety of cationic polymeric materials.

The second essential component used in the composition of the present invention is identified as component (B), is water-dispersible non-gelled polymeric material carrying a cationic charge, and having a pKb value above 5.5 which polymeric material contains at least one class of reactive groups selected from the groups consisting of carboxyl groups, hydroxy groups and amide groups and said polymeric material also contains amino groups wherein the total amount of said groups is present in an amount of at least about 0.5%, by weight, and not more than about 15%, by weight, based on the total weight of the polymeric material. The presence of amino groups is essential to impart cationic character to the polymer and to obtain stable dispersion in water in the presence of an acid solubilizer but the amino groups are not heat reactive with component (A) which is the modified cross-linking agent. These stated reactive groups are heat reactive with the component (A) which is the modified cross-linking agent.

The cationic water-dispersible non-gelled polymeric materials used in the composition of the present invention may be any one of a plurality of polymeric materials which have reactive sites that are heat reactive with the modified cross-linking agents used in the compositions of the present invention. These reactive sites may be either carboxyl groups and/or alcoholic hydroxyl groups and/or amide groups which polymeric materials may be the result of vinyl polymerization. The polymeric material in addition to the reactive groups must contain amino groups. Therefore, all of the polymerizable monomers in each of these four principal classes may be used to prepare the cationic polymeric materials used in the present invention.

The water-dispersible non-gelled polymeric material containing carboxyl groups may be prepared by polymerizing, with an amino group containing monomer, an α-β-ethylenically unsaturated carboxylic acid such as acrylic acid, methacrylic acid, crotonic acid, cinnamic acid, β-benzoyl acrylic acid, and polycarboxylic acids of the α,β-ethylenically unsaturated class such as maleic, fumaric, itaconic, mesaconic, aconitic and the halogenated acids such as halogenated maleic or, more specifically, chloromaleic acid, and the like with other polymerizable monomers. These carboxyl group containing vinyl monomers may be co-polymerized with one another or co-polymerized with other monomers which contain no carboxyl groups such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate, and the like. Still further, one could use such polymerizable compounds as styrene, ortho-, meta- or para-alkyl styrenes such as the o-, m- or p- methyl, ethyl, propyl and butyl styrenes, 2,4-dimethyl styrene, 2,3-dimethyl styrene, vinyl naphthalene, acrylonitrile, methacrylonitrile, halo ring or side chain styrenes such as α-chloro styrene, ortho-, meta- or para-chloro-styrenes, 2,4-dichloro-styrene, 2,3-dichlorostyrene, 2,5-dichlorostyrene or the alkyl side chain styrenes such as α-methyl styrene, α-ethyl styrene, and the like.

The polymeric materials containing alcoholic hydroxyl groups may be prepared by using a polymerizable vinyl monomer which contains an acoholic hydroxyl group, with an amino group-containing monomer, and is to be found in such compounds as the hydroxy alkyl esters of α,β, ethylenically unsaturated monocarboxylic acid such as the hydroxy alkyl ester of acrylic acid, methacrylic, ethacrylic and chloro as well as the other halo substituted acrylic acids. These esters may either have a primary or a secondary hydroxyl group. Illustrative of the types of alcoholic-hydroxy group-containing compounds that may be used to make these polymeric materials are 2-hydroxyethyl acrylate, 3-hydroxypropyl acrylate, 2-hydroxbutyl acrylate, 3-hydroxybutyl acrylate, 4-hydroxybutyl acrylate, 8-hydroxyoctyl acrylate, 2-hydroxyethyl methacrylate, 5-hydroxyhexylmethacrylate, 6-hydroxyoctylmethacrylate, 8-hydroxy-octylmethacrylate, 10-hydroxydecylmethacrylate, 3-hydroxypropyl crotonate, 4-hydroxyamyl crotonate, 5-hydroxyamyl crotonate, 6-hydroxyhexyl crotonate, 7-hydroxyheptyl crotonate, 10-hydroxydecyl crotonate, and the like. These hydroxy esters may be used either singly or in combination with one another or with other polymerizable vinyl monomers devoid of any alcoholic hydroxyl group including those set forth hereinabove in the discussion of the carboxyl group-containing monomers.

Among the amide group-containing monomers which may be used in the preparation of the water dispersible polymeric materials used in the present invention are acrylamide, methacrylamide, ethacrylamide, N-tertiarybutyl acrylamide, and the like. These polymerizable acrylamides may be used alone with an amino group-containing monomer to prepare polymeric materials used in the present inventions or with any of the carboxyl group-containing monomers or the hydroxyl group-containing monomers or with any of the other polymerizable monomers set forth hereinabove.

These cationic polymeric materials can be broadly described as being selected from any one of the following classes: acrylic polymers, of which a substantial variety are vinyl and acrylic monomers such as all of those set forth hereinabove and must be copolymerized with amino group-containing monomers such as aminoacrylates and aminomethacrylates such as dimethylaminoethyl methacrylate, diethylaminoethyl acrylate, dimethylaminopropylacrylate and t-butylaminoethylmethacrylate, and the like. These polymers can be dissolved or dispersed in water with the addition of a water dispersible acid such as hydrochloric acid, acetic acid, and the like. It must be kept in mind that these polymers must also contain some —OH and/or —COOH and/or

groups and must also contain the amino group, —NR$_1$R$_2$ where R$_1$ = H, alkyl, R$_2$ = alkyl which can be obtained by copolymerizing vinyl monomers with comparatively small amounts of such polymerizable monomers as hydroxyethyl methacrylate and/or acrylic acid or acrylamide. In this same broad classification, the aminomethacrylates may be replaced by methylvinyl pyridine, and the like. The resulting polymer must also have pKb value higher than 5.5. Polymers containing this type of amino monomer can also be water dispersed by the addition of such water dispersible acids such as hydrochloric and acetic acid. The formation of the amine salt results in water solubility or water dispersibility.

In the water dispersible, non-gelled, polymeric material carrying a cationic charge, the amount of carboxyl groups and/or alcoholic hydroxyl groups and/or amide groups together with the amino groups should be at least about 0.5%, by weight, based on the total weight of the polymeric material and not greater than about 15%, by weight, based on the total weight of the polymeric material. Preferably, one would use between about 1% to about 10%, by weight, based on the total weight of the polymeric material of the carboxyl group-containing monomer and/or the alcoholic hydroxyl group-containing monomer and/or the amide group-containing monomer together with the amino-containing monomer. There percentages, by weight, prevail whether the individual monomer-containing carboxyl groups, alcoholic hydroxyl groups or amide groups are the sole reactive groups present with the amino group monomers or whether they are present in any of the above total combinations.

The amount of amino groups in the cationic polymer should be at least about 0.25%, by weight, based on the total weight of the polymeric material and not greater than about 5%, by weight, based on the polymeric material. It is preferred to use between about 0.5% to about 3.0%, by weight, based on the total weight of the polymer. When carboxyl groups are present, the polymer acquires an amphoteric character. However, its aqueous dispersion prepared by the use of an acid solubilizer will cause it to migrate to the cathode under electric potential. The amount of the carboxyl groups and/or alcoholic hydroxy groups and/or the amide groups should be between 0.25% and 12% same basis, and preferably 1% to 10%.

The third essential component used in the composition of the present invention is an acid solubilizer and is identified as component (C). These acid solubilizers may be organic or inorganic acids which are at least water dispersible and which can convert a water-insoluble non-gelled polymeric cationic material to a water-dispersible non-gelled polymeric material carrying a cationic charge. Among the inorganic acids which may be used as an acid solubilizer are hydrochloric acid and other hydrohalic acids, nitric acid, sulfuric acid, phosphoric acid and the like. Among the organic acids which may be used as the acid solubilizer are formic acid, acetic acid, propionic acid, butyric acid, pentanoic acid, or the polycarboxylic acids such as adipic, oxalic, malonic, succinic, or the $\alpha$-$\beta$-ethylenically unsaturated dicarboxylic acid such as maleic, fumaric and the like.

The acid solubilizer combines with the basic nitrogen atoms of the polymer to form charge polarized groups which on solvation in water results in water dispersibility of the cationic polymer. In the absence of an acid solubilizer, the polymer is insoluble and is also indispersible in water. Also, the acid solubilizer has to be a water soluble material so that the counterion formed when the acid is added to the cationic polymer, facilitates the water dispersion or solubilization of the cationic polymer.

The amount of the first component in the compositions of the present invention, namely component (A), the modified cross-linking agent may be varied between 4% and about 50%, by weight, whereas the amount of component (B), the cationic polymeric material may be varied between 40% and about 90%, by weight, while the amount of the third component (C) may be varied between 1% to about 10%, by weight, totaling 100%, and based on the total solids weight of (A), (B) and (C).

The cationic polymeric material (B) must have a pKb value greater than 5.5 whereas the modified cross-linking agent (A) must have a pKa value below 3.6.

In order to prepare the modified cross-linking agents used in the compositions of the present invention, one would utilize from about 0.1 to about 1.0 mols of an organic acid containing a hydroxy group, whether alcoholic hydroxy group or phenolic hydroxy group, such as salicylic acid and it is condensed with 1 mol of a selected aminoplast cross-linking agent, such as hexakismethoxymethyl melamine or the di-ethoxy, dimethoxymethyl benzoguanamine. The reaction is stopped when almost all of the free acid has been consumed. This reaction is in the nature of a transetherification reaction in which some of the original alcohol which had been utilized to alkylate the triazine derivative is replaced by the salicylic acid. In the subsequent reaction, if desired, the hydrophobicity of the modified cross-linking agent can be increased by transetherification of the methoxy or ethoxy groups by higher alcohols such as butanol, isobutanol and the like.

The following examples, in which all parts are parts by weight, are illustrative of the processes for making the modified cross-linking agents used in the compositions of the present inventions.

MODIFIED CROSS-LINKING AGENT A

Into a suitable reaction vessel equipped with a stirrer, nitrogen inlet tube, thermometer and condenser, there is introduced 2400 parts of hexamethoxymethylmelamine and 180 parts of salicylic acid. The reaction mixture is heated under a blanket of nitrogen with constant stirring to 118°–119° C. and the methanol formed during the reaction is distilled off. After collecting 120 parts of the distillate, the product is cooled to 100° C. and 280 parts of isobutanol is charged into it. The temperature is maintained at 102°–105° C. until an additional 85 parts of methanol are distilled over. The product is cooled to room temperature after the addition of an additional 200 parts of isobutanol and is then filtered. The final product has a Gardner-Holdt viscosity of $Z_3$ when measured on a 90% solids solution in isobutanol at 25° C. The product and a pKa value of 2.8 and an acid number of 26.

MODIFIED CROSS-LINKING AGENT B

Into a suitable reaction vessel equipped as in the preceding example, there is introduced 2400 parts of hexamethoxymethylmelamine and 180 parts of salicylic acid. Using substantially the same reaction conditions as in the preceding example, 120 parts of methanol are collected followed by the addition of 1330 parts of isobutanol. At 102°–103° C., 755 parts of distillate are collected. The resulting reaction product is then cooled followed by the addition of 350 parts of isobutanol. The final product is then filtered. The resinous product had a viscosity of W-X on the Gardner-Holdt scale at 25° C. measured on a 85% solids solution in isobutanol. The product has a pKa value of 2.7 and an acid number of 23.

MODIFIED CROSS-LINKING AGENT C

Into a suitable reaction vessel such as used in the modified cross-linking agent A there is introduced 2400 parts of di(ethoxymethyl) di(methoxymethyl) benzoguanamine and 280 parts of salicylic acid. The reaction mixture is heated with constant stirring under a blanket of nitrogen at 120° C. After collecting 160 parts of methanol, the product is diluted with 440 parts of n-butyl cellosolve and is then cooled. The final product was a 85% solids solution, had a pKa value of 2.8 and had an acid number of 28.

MODIFIED CROSS-LINKING AGENT D

Into a suitable reaction vessel equipped as in modified cross-linking agent A, there is introduced 600 parts of hexakismethoxymethylmelamine and 45 parts of hydroxy acetic acid. The reaction mixture is heated under a blanket of nitrogen gas with constant stirring to 110° C. and the methanol formed during the reaction is distilled off. After collecting 17 parts of the distillate, the product is cooled to 25° C. and the highly viscous product of 100% solids and a pKa value of 3.5 and had an acid number of 38.

CATIONIC POLYMERIC MATERIAL A

Into a suitable reaction vessel equipped with a stirrer, reflux condenser, thermometer, and nitrogen inlet and outlet tubes, there is introduced 105 parts of dioxane, which is then heated to about 90° C. whereupon a blend of 165 parts of n-butyl acrylate, 75 parts of methyl methacrylate, 30 parts of t-butylaminoethyl methacrylate, 30 parts of 2-hydroxyethyl acrylate, 8 parts of n-dodecylmercaptan and 6 parts of azobisisobutyronitrile is added incrementally. The total feed time was approximately 2½ hours. After the addition of the blend is completed, the reaction mixture is held at about 95° C. for about 2 hours and is later cooled to room temperature. The final resin solids was 70.5%. The resin had a hydroxyl number of 48, an amine number of 30, and a pKb value of 6.06.

CATIONIC POLYMERIC MATERIAL B

Into a suitable reaction vessel equipped with a stirrer, reflux condenser, thermometer and nitrogen gas inlet tube, there is introduced 100 parts dioxane which is then heated to about 90° C., whereupon a blend of 330 parts of n-butyl acrylate, 150 parts of methyl methacrylate, 80 parts of t-butyl amino ethyl methacrylate, 120 parts of 2-hydroxyethyl acrylate, 12 parts of n-dodecyl mercaptan and 12 parts of azobisisobutyronitrile is added incrementally. The total feed time was approximately 2½ hours. After the addition of the blend is completed, the reaction mixture is held at about 95° C. for about 2 hours followed by the addition of 190 additional parts of dioxane. The final resin solids were 70%. The resin had a hydroxyl number of 85, an amine number of 35, and its pKb value was similar to that of the polymeric material A.

CATIONIC POLYMERIC MATERIAL C

Cationic polymeric material B is repeated in all essential details except that an equivalent amount of styrene was utilized in the place of methyl methacrylate. The pKb value was similar to the pKb value of polymeric material A.

CATIONIC POLYMERIC MATERIAL D

A cationic polymeric material similar to the polymeric material B is prepared except that in the place of the t-butyl amino ethyl methacrylate there was substituted an equivalent amount of dimethyl amino ethyl methacrylate. The resultant resin had a hydroxy number of 85, an amine number of 35 and pKb value of 6.79.

CATIONIC POLYMERIC MATERIAL E

Into a suitable reaction vessel equipped with a stirrer, reflux condenser, thermometer and nitrogen gas inlet tube, there is introduced 150 parts of dioxane. The dioxane is heated to about 90° C. whereupon there was added to the heated dioxane a blend of 330 parts of n-butyl acrylate, 180 parts of styrene, 90 parts of N,N-dimethyl amino ethyl methacrylate, 120 parts of 2-hydroxyethyl acrylate, 15 parts of the reaction product of acrylic acid with a methoxypolyethyleneglycol having a molecular weight of 550, 12 parts of N-dodecyl mercaptan and 12 parts of azobisisobutyronitrile in increments. The total feed time was approximately 2½ hours. After the complete addition of the blend has been accomplished, the reactants are held at about 95° C. for 2 hours followed by the addition of 132 parts of dioxane. The final polymeric material solids were 70%. The polymeric material had a hydroxy number of 90, amine number of 44, and pKb was 6.8.

COMPARATIVE CATIONIC POLYMERIC MATERIAL F

Into a suitable reaction vessel equipped with a stirrer, a reflux condenser, thermometer, and nitrogen gas inlet tube, there is introduced a mixture of 400 parts of toluene, 400 parts of a commercially available epoxy resin identified as DER661 (believed to have an epoxide equivalent weight of 475–575), and 61 parts of 1,3-diaminopropane. The mixture was refluxed for 1 hour. The resulting amber colored clear solution was distilled, first at atmospheric pressure and later under reduced pressure to remove the toluene and the unreacted 1,3-diaminopropane. The resulting viscous product was diluted with cellosolve to 52.5% solids solution. The product had an amine number of 71-72, and a $pKb_1$ value of 4.35 and a $pKb_2$ value of 6.50. The two pKb values reflect the presence of two types of nitrogen atoms with different basicities and the lower type prevails because it is a stronger base.

In order that the concept of the present invention may be more fully understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE 1

Into a suitable mixing vessel equipped with a high speed, stirrer there is introduced 83 parts of the cationic material B, 21 parts of the modified cross-linking agent A, 1.5 parts of acetic acid and 23 parts of titanium dioxide pigment. These ingredients are ground in the mixing vessel with the high speed stirrer, after which 850 parts of deionized water is added slowly with continuous stirring. The final aqueous paint contains 10% solids and has a pH of 4.4. After aging the paint overnight, cold rolled steel panels were electrocoated at 150 volts for 60 seconds. The electrocoated panels were then rinsed with deionized water and cured by baking at 175° C.–200° C. for about 20 minutes. The cured films had very good solvent resistance and good mechanical properties.

EXAMPLE 2

The mixing procedure of Example 1 is repeated in all essential details except that there is used 107 parts of the cationic polymeric material B, 28 parts of the modified cross-linking agent B, 0.5 part of acetic acid and 1 part of a predispersed carbon black pigment to produce a black paint. The bath pH was 4.5. After the films had been electrocoated on the cold rolled steel panel cathode, the films are rinsed and then cured as in Example 1. The cured films had a very good solvent resistance and excellent mechanical properites. Furthermore, the paint bath was stable at 25° C. for more than 1 month.

EXAMPLE 3

Into a suitable mixing vessel equipped with a high speed stirrer as in Example 1, there is introduced 83 parts of the cationic polymeric material E and 21 parts of the modified cross-linking agent A together with 0.5 part of acetic acid. The procedure of Example 1 was followed in all essential details and the final aqueous paint had a solids content of 10% and a pH of 5. After aging the paint overnight, cold rolled steel panels were electrocoated at 150 volts for 30 seconds. Thereupon, the coated panels were rinsed with deionized water and were then cured at 175° C.–200° C. for 20 minutes. The cured films had a very good solvent resistance and good mechanical properties.

EXAMPLE 4

Into a suitable mixing vessel equipped with a high speed stirrer there was introduced 82 parts of cationic polymeric material B, 18 parts of the modified cross-linking agent D, 1 part of acetic acid and 23 parts of titanium dioxide pigment. The ingredients were ground in the mixer and after sufficient grinding, 850 parts of deionized water were added slowly with continuous stirring. The final paint solids was 10%. The paint had a pH of 5.0. After aging the paint overnight, cold rolled steel panels were electrocoated at 100 volts for 60 seconds. After rinsing the panels with deionized water, they are cured at about 200° C. for 20 minutes. The cured film had good solvent resistance and good mechanical properties.

COMPARATIVE EXAMPLE 5

Example 1 is repeated in all essential details except that in the place of the modified cross-linking agent A there was substituted an equivalent amount of Hexakis (methoxymethyl) melamine (HMMM) as the cross-linking agent. The bath was unstable and showed poor desposition characteristics. Furthermore, the electrocoated films, even when baked at 220° C. for 20 minutes did not cross-link. HMMM has a pKa value of about 7.0.

COMPARATIVE EXAMPLE 6

Into a suitable mixing vessel there is introduced 36 parts of the cationic polymeric material F and 7 parts of the modified cross-linking agent A, and, after thorough blending, a film of 1 mil thickness was cast on an iron substrate from the mixture and baked at 175° C. for 20 minutes. The baked film was not cross-linked. It showed poor solvent resistance. The poor cross-linking is rationalized on the basis that the cationic polymeric material F has a pKb value of 4.35 and therefore too basic to cross-link with the modified cross-linking agent A.

EXAMPLE 7

Example 1 was repeated in all essential details except that in the place of the cationic polymeric material B there was substituted an equivalent amount of the cationic material A. Comparable results were achieved.

The bath instability in the comparative example 5 is due to the fact that such cross-linking agents, in an unmodified form, based on melamine or benzoguanamine hydrolyze rapidly in the presence of water under acidic conditions. Additionally, these cross-linking agents do not react with —OH, —$CONH_2$ or COOH groups in the presence of basic groups. The modified cross-linking agents used in the compositions of the present invention, cross-link quite effectively with —OH, —$CONH_2$ or COOH groups in the presence of basic groups provided that the cross-linking agent has a pKa value lower than about 3.6 and the cationic polymeric material with basic groups has a pKb value higher than 5.5.

In the U.S. Pat. No. 3,502,557 there is used a modified cross-linking agent of the same class that is used in the composition of the present invention except that the electrocoating composition is used for anodic deposition. The deposited film consisting of an anionic polymeric material plus the modified cross-linking agent is acidic. The cross-linking agent based on a melamine derivative would be expected to cross-link under acidic conditions but would not be expected to cross-link under basic conditions. In the present invention, the electrodeposition takes place on the cathode. The deposited film is comprised of a blend of a cationic polymeric material and a modified amino cross-linking agent. The film is in a basic pH environment. Under basic pH conditions, the cross-linking of the film was unexpected, based on the prior knowledge in the literature, that unmodified melamine based cross-linking agents do not react with the —OH groups or the —CONH$_2$ groups under basic conditions. When we first discovered this unexpected result, we investigated the pH requirements of the cationic polymeric material and the modified cross-linking agent in order to determine why they could be cross-linked efficiently in a cathodic electrodeposited film. These pH requirements are also well defined and therefore the aqueous coatings of the present invention should have a pH between 3 and 7. We also observed that the bath stability under acidic pH was also unexpected as it was known that ordinarily amino cross-linking agents hydrolyze in an aqueous medium under acidic conditions.

In preparing the modified cross-linking agents used in the present invention, one may react the aminoplast cross-linking agent with the non-resinous hydroxyl group containing carboxylic acid in a mol ratio varying between 1:0.1 to 1.0, agent to acid respectively and preferably 1:0.2 to 0.5 respectively.

In the coating composition of the present invention, one may use the cationic polymeric material in weight proportions varying between 40% and 90% and the modified cross-linking agent may be used in amount, by weight, varying between 4% and 50%. The acid solubilizer may be used in amounts, varying between 1% and 10%. The total weight of these three components will be 100%. The coating compositions of the present invention may be used without benefit of any pigment material in which event the deposited film will be clear. However, most coatings are preferably colored and pigments amounting to up to 50%, by weight, based on the total solids weight of (A), (B) and (C) may be used.

The cationic polymeric material of the present invention is a low molecular weight polymer having basic nitrogen groups along with the hydroxyl groups and/or amide groups and/or carboxyl groups. This polymeric material may be the acrylic type, polyester type, maleinized oil type or similar type of resins. The basic nitrogen groups in the cationic resinous polymeric material should be present in an amount varying between 0.3 mol to 2.0 mols per 1000 grams of resin and preferably between 0.4 mol and 0.8 mol per 1000 grams of resin. In carrying out an electrodeposition operation, the bath solids can be varied between 1% and 20% and preferably between 5% and 15%. For shipping purposes the paint solids in water base paints can be between 25% and 70% and preferably between 35% and 60%.

It is also within the scope of the present invention to incorporate various additives into our novel compositions. For example, various dyes or pigments, e.g., TiO$_2$; Fe$_2$O$_3$, etc., can be added so that the coating which results from the electrodeposition process will be colored, e.g., white, red, etc.

We claim:

1. A composition of matter comprising an aqueous dispersion of a mixture from about 4% to 50%, by weight, of (A) an ungelled modified cross-linking agent, having a pKa value of 3.6 or lower, comprising an aminoplast cross-linking agent modified by reaction with a non-resinous hydroxyl-group containing carboxylic acid, wherein the mol ratio of said unmodified cross-linking agent to said non-resinous hydroxyl-group containing carboxylic acid is between 1:0.1 and 1:1 respectively, from about 40% to about 90%, by weight, of (B) a water dispersible non-gelled polymeric material carrying a cationic charge and having a pKb value above 5.5, which polymeric material contains at least one class of reactive groups, selected from the group consisting of carboxyl groups, alcoholic hydroxy groups and amide groups and said polymeric material also contains amino groups wherein the total amount of said groups is at least about 0.5%, by weight, and not more than about 15%, by weight, based on the total weight of the polymeric material, wherein the total amount of said amino groups is at least about 0.25% and not greater than about 5%, by weight, based on the total weight of said polymeric material wherein said carboxyl groups, alcoholic hydroxy groups and amide groups are heat reactive with (A), and from about 1% to about 10%, by weight, of (C) an acid solubilizer, wherein the said percentages of (A), (B) and (C), by weight, total 100% and are based on the total solids weight of (A), (B) and (C).

2. The composition according to claim 1 in which the aminoplast cross-linking agent is a hexaalkyl ether of hexamethylol melamine in which the alkyl group contains from 1 to 4 carbon atoms.

3. The composition according to claim 2 in which the melamine derivative is hexakismethoxymethylmelamine.

4. The composition according to claim 1 in which the aminoplast cross-linking agent is a tetraalkyl ether of tetramethylol benzoguanamine in which the alkyl group contains from 1 to 4 carbon atoms.

5. The composition according to claim 4 in which the benzoguanamine derivative is di(ethoxymethyl)-di(methoxymethyl) benzoguanamine.

6. The composition according to claim 1 in which the non-resinous hydroxyl-group containing carboxylic acid is salicylic acid.

7. The composition according to claim 2 in which the non-resinous hydroxyl-group containing carboxlyic acid is salicylic acid.

8. The composition according to claim 3 in which the non-resinous hydroxyl-group containing carboxylic acid is salicylic acid.

9. The composition according to claim 5 in which the non-resinous hydroxyl-group containing carboxylic acid is salicylic acid.

* * * * *